United States Patent [19]

Hinz et al.

[11] 4,392,194

[45] Jul. 5, 1983

[54] CIRCUIT ARRANGEMENT FOR CONTROLLING A LARGE NUMBER OF PRINTING ELECTRODES FOR NON-MECHANICAL PRINTING

[75] Inventors: Hans D. Hinz, Tornesch; Herbert Löbl, Hamburg, both of Fed. Rep. of Germany

[73] Assignee: U.S. Philips Corporation, New York, N.Y.

[21] Appl. No.: 237,817

[22] Filed: Feb. 25, 1981

[30] Foreign Application Priority Data

Feb. 28, 1980 [DE] Fed. Rep. of Germany ....... 3007465

[51] Int. Cl.³ .............................................. G01D 15/06
[52] U.S. Cl. .................................................... 346/154
[58] Field of Search ......................................... 346/154

[56] References Cited

U.S. PATENT DOCUMENTS 2,955,894 10/1960 Epstein ................................. 346/154

Primary Examiner—L. T. Hix
Assistant Examiner—Thomas H. Tarcza
Attorney, Agent, or Firm—James J. Cannon, Jr.

[57] ABSTRACT

A large number of printing electrodes are combined to form groups which each time have a common switching point, each printing electrode of the same ordinal number of each group being connected to a common voltage amplifier. A capacitor (C) is connected between the common switching point (G) of a group and the electrical control element (SK) associated with each printing electrode (BE). All capacitors are simultaneously charged, however, consecutively one group after the other, to the analog voltages which correspond to the information to be printed and which are present on the relevant voltage amplifiers (V). The time required for the charging of all capacitors (C) is less than the printing time for an image element. The circuit arrangement is particularly suitable for an electrophoretic printing method.

11 Claims, 11 Drawing Figures

CIRCUIT ARRANGEMENT FOR CONTROLLING A LARGE NUMBER OF PRINTING ELECTRODES FOR NON-MECHANICAL PRINTING

BACKGROUND OF THE INVENTION

1. Field of the Invention

The invention relates to a circuit arrangement for controlling a large number of printing electrodes for the non-mechanical parallel printing of character elements or image elements, the printing electrodes being combined to form groups, each of which has a common switching point, corresponding printing electrodes of each group being associated with a common voltage amplifier via electronic control elements, a selected printing electrode being controlled by the switching of a group switch and an amplifier.

2. Description of the Prior Art

For printing and facsimile systems, use is made of devices which utilize electrical digital or analog character signals or image signals in order to compose the corresponding image from separate image elements on a record carrier, for example, paper. The image forming electrodes (printing electrodes) are arranged in a fixed printing electrode array so that one printing electrode is associated with each image element (line parallel printing). A matrix arrangement of the printing electrodes is also known.

U.S. Pat. No. 2,955,894 discloses an electrostatic printing method where the printing electrodes are arranged in a row or a matrix. According to this printing method, an image element is produced in that a gas discharge which produces the charge carriers for the electrostatic charging of the image element is ignited when a given voltage threshold value between the printing electrode and the record carrier is exceeded.

Because a very large number of printing electrodes is required in accordance with the desired resolution of the image, coincidence methods are used for the selective control of these printing electrodes. The number of electronic switches or amplifiers and hence the total number of electronic components can be substantially reduced by means of these coincidence methods.

For example, from German Pat. No. 19 46 815 it is known to combine the printing electrodes to form groups which can be selectively and sequentially controlled. Mutually insulated counter-electrodes are then provided on the rear of the record carrier. A group of printing electrodes is selected by supplying the counter-electrode situated opposite this group with a voltage pulse whose amplitude is proportioned so that the threshold voltage for the ignition of a gas discharge between record carrier and printing electrodes is exceeded. The standard ignition voltage is then the sum of the supplied printing electrode voltage and the supplied counter-electrode voltage. Because printing electrode voltages are always lower than the ignition voltage, a gas discharge required for printing can be produced only in coincidence with a voltage pulse on a counter-electrode. Corresponding printing electrodes of the individual groups are interconnected, so that the number of printing electrode switches equals the number of printing electrodes of a group. The total number of printing electrode switches and counter-electrode switches is reduced to $2\cdot\sqrt{Z}$ in the most favourable case, Z being equal to the total number of printing electrodes.

According to this coincidence method coincidence exists between the discrete electrical image signals present on the printing electrodes and the selection pulse of a counter-electrode for the total printing duration of the selected printing electrode. The separate printing electrode groups successively participate in the printing operation.

German Auslegeschrift No. 18 00 137 discloses the control of the printing electrodes of a thermographic printer in which each resistance element (printing electrode) is connected to a thyristor. Using group switches, a separate group of resistance elements can be selected and a current which suffices for printing can be produced through these resistance elements. The required switching time is small with respect to the printing time required for an image element, so that all groups can be switched on within a short period of time after which all resistance elements simultaneously participate in the printing process. For the same voltage decrease the same current flows through all resistance elements participating in the printing process. A voltage which is variable for the individual resistance element, and hence a variable current, cannot be switched by means of the described circuit arrangement.

The electrostatic and thermographic printing methods do not enable true half-tone printing, because the individual image elements cannot be deliberately varied as regards charge density or size. Only so-called pseudo-half-tones can be realized by element density modulation.

In order to satisfy the more severe requirement as regards the quality of the printed images such as, for example, for the printing of true half-tone images or color images with real color tones, other image printing methods must be used. For example, the electrophoretic printing method known from German Offenlegungsschrift No. 28 08 446 and the Corona method known from German Offenlegungsschrift No. 19 34 890 are perfectly suitable in this respect.

Like the electrostatic printing method, these printing methods involve a large number of printing electrodes for the formation of the separate image elements, so that a device is required for coincidence control of the printing electrodes.

However, because the charge density and the half-tone value of an image element are a function of the voltage on the printing electrode in the latter two printing methods, analog high voltage signals must be processed instead of discrete voltages. A threshold voltage value below which printing no longer takes place, as used for the electrostatic method, does not exist. The processing of analog high voltage signals, however, requires expensive amplifier elements, so that the use of such methods is only feasible if the number of such amplifier elements can indeed be substantially reduced.

Furthermore, contrary to the conventional electrostatic method where the printing time per image element is only some tens of microseconds, printing times of a few milliseconds would be required for a true half-tone reproduction, i.e. true to the original. A coincidence device which successively activates each electrode group would lead to an unacceptable printing time for the customary resolutions of the picture of from 4 to 8 elements per millimeter for a full DIN A4 page. Therefore, if the printing speeds per page which can be achieved by means of the conventional electrostatic printing methods are also to be realized for printing methods such as the electrophoretic method or the corona method which are slow in principle, the only solution will be simultaneous operation of all printing electrodes (parallel printing).

SUMMARY OF THE INVENTION

It is an object of the invention to provide a circuit arrangement for printing methods involving analog printing electrode voltages with a comparatively long constant printing time of a few milliseconds per image element and a stationary array of printing electrodes, each image element having associated with it a printing electrode and the number of amplifier elements having been substantially reduced while simultaneous operation of all printing electrodes (parallel printing) is still ensured, so that a short printing time per page is obtained.

To this end, the device in accordance with the invention is characterized in that a capacitor is connected between the common switching point of a group of printing electrodes and the electrical control element associated with each printing electrode, the capacitor associated with an arbitrary printing electrode being charged to the analog voltage generated in the associated amplifier by the closing of the group switch of the relevant group, said voltage determining the printing effect of the associated printing electrode, the discharging of the capacitor which takes place after the opening of the group switch during the printing time for an image element by the associated printing electrode being substantially slower than the preceding charging, the capacitors being group-wise successively charged to the voltages which are analogous to the information to be printed, the time required for the charging of all capacitors being less than the printing time for one image element. As a result, simultaneous printing of the information of a row by all printing electrodes is obtained. After the charging, the output signals of the high voltage amplifiers are changed in accordance with the further information and the next group of printing capacitors receives the changed printing signals via the corresponding group switch. The charging time of a group of capacitors should be chosen so that the sum of all group charging times during a charging period (time required for charging all capacitor groups once) is smaller than the printing time per image element.

Thus, in the device in accordance with the invention coincidence between the analog image signals supplied by the high voltage amplifiers and the switching pulse for the corresponding group switch exists only during the charging period of the relevant group of capacitors. The printing period of a printing electrode group is defined as the period of time expiring between the charging of the corresponding group of capacitors and the instant of charging of this capacitor group to the new printing voltage. Contrary to the known coincidence methods for electrostatic printing, coincidence of image signals and switching pulses occurs only during a fraction of the total printing period of a printing electrode group. Because it is no longer necessary to wait for the end of the printing period of the preselected first printing electrode group for the next coincidence, simultaneous (parallel) operation of all printing electrodes is possible.

Because a counter-electrode in the sense of the known electrostatic printing method cannot be used for the electrophoretic printing method and the corona method due to the absence of a threshold voltage and the analog image signal values, the corresponding printing electrodes of the various groups which are connected to a separate high voltage amplifier must be uncoupled by suitable steps. Moreover, discharging or recharging of the printing capacitors after a printing period must be possible, because these capacitors are only partly discharged during a printing period. Only slight discharging of the capacitors during the printing of an image element is desirable, because the printing period can thus be substantially reduced.

A whole series of solutions are feasible for realizing the circuit arrangement in accordance with the invention with different electronic uncoupling elements, discharging elements and group switches. The choice from these possibilities, of course, should always be made on the basis of the printing method to be used.

Some preferred embodiments in accordance with the invention will be described in detail hereinafter with reference to the accompanying diagrammatic drawing.

DESCRIPTION OF THE PREFERRED EMBODIMENT

The basic idea of the coincidence switching device for parallel printing will be described in detail with reference to FIG. 1. The printing electrodes $BE_{11}$ to $BE_{NK}$ are divided into N groups of K printing electrodes each. The number of high voltage amplifiers $V_1$ to $V_K$ corresponds to the number of printing electrodes $BE_{11}$ to $BE_{1K}$ in a group. A group switch $S_1$ to $S_N$ is associated with each group $GR_1$ to $GR_N$ of printing electrodes $BE_{11}$ to $BE_{NK}$. The total number of high voltage amplifiers V and group switches S is minimized if the relation $N \approx K \approx \sqrt{Z}$ is satisfied, Z being the total number of printing electrodes. Obviously, other suitable values can also be chosen for N and K. The sum of the group charging times in a charging period, however, should always be smaller than the printing time per image element.

Figure 1:
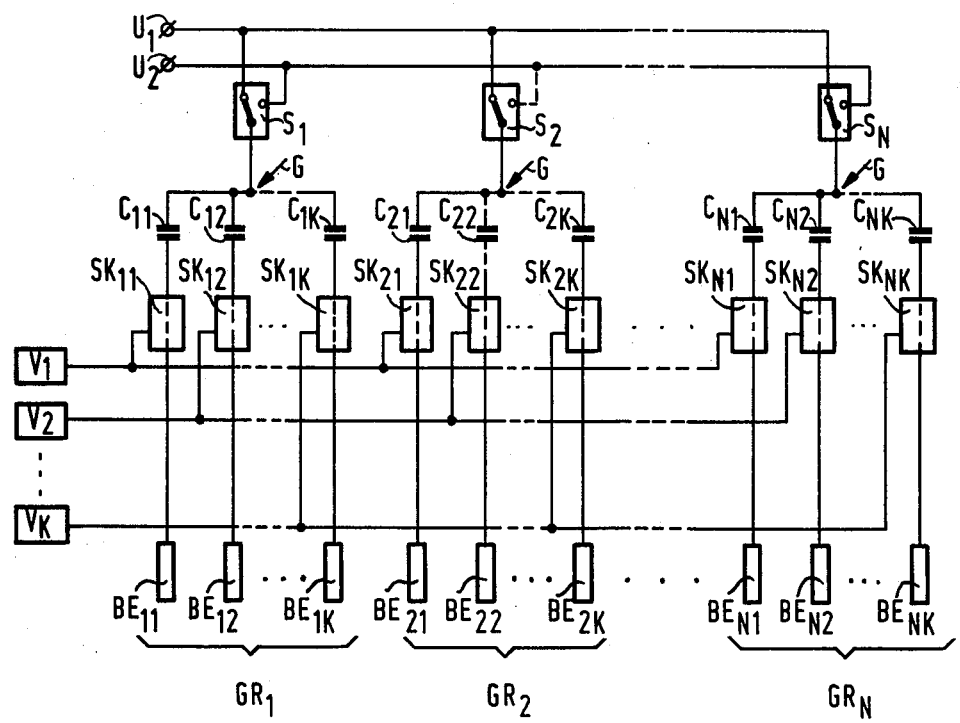
FIG. 1 is a block diagram of an embodiment of a device in accordance with the invention.

In the simplest case, the printing electrodes BE are arranged in a row and adjacently situated electrodes can be combined to form a group as shown in FIG. 1. If two or more staggered rows of printing electrodes are accommodated in the printing head, other group formations may be advantageous. For the sake of simplicity, a printing head in which the printing electrodes are arranged in a row will be described in detail hereinafter.

Each high voltage amplifier V is connected to the corresponding printing electrodes $BE_{1K}$, $BE_{2K}$, ... $BE_{NK}$ and the corresponding printing capacitors $C_{1K}$, $C_{2K}$, ... $C_{NK}$ via electronic control elements SK. The control elements SK serve to enable uncoupling between the printing electrodes BE and also the charging and discharging of the printing capacitors C. The group switches S serve for the selection of a given group of printing electrodes. The group switches S are successively switched on so that always only one printing capacitor group is being charged at any instant.

Depending on the construction of the control elements SK and of the group switches S, various time-related processes as regards charging and printing arise. Two feasible processes are shown in the diagrams of the FIGS. 2 and 3.

Figure 2:
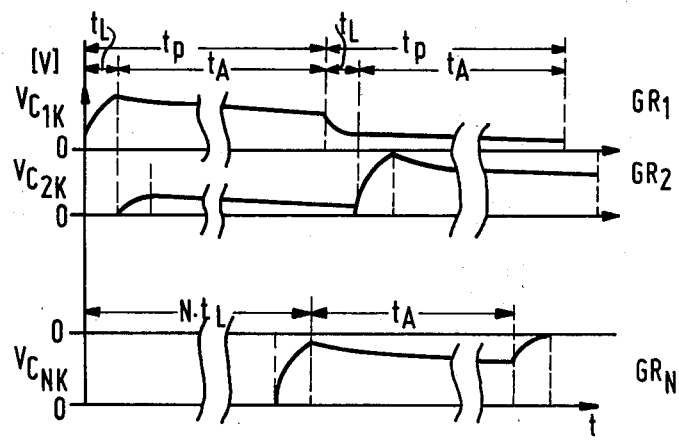
FIG. 2 shows a pulse diagram for the voltage across corresponding printing capacitors $C_{1i}, C_{2i} \ldots C_{Ni}$ without intermediate discharging of these capacitors.

FIG. 2 shows a voltage variation across corresponding printing capacitors $C_{1K}$, $C_{2K}$, ... $C_{NK}$ as a function of time, without intermediate discharging of these capacitors.

The printing period $r_p$ consists of the charging time $t_L$ and the printing time $t_A$. $t_A$ and $t_L$ are the same for all groups. During the charging time $t_L$, the printing capacitors C of a group are charged to the analog voltages corresponding to the information to be printed. During the printing time $t_A$, the capacitors are partly discharged and, after expiration of $t_A$, they are charged to new analog voltages. Because the new capacitor charges may be larger or smaller than the previous capacitor charges, the control elements SK must conduct the current in both directions. Directly after the charging of the first capacitor group C1, the charging for the second group C2 commences, etc. The charging of the group N has already been completed before expiration of the printing time $t_A$ of the first group. Because a printing action of the printing electrodes BE is possible already at low voltages and is already present during the charging time $t_L$, $t_L$ must be as small as possible, with respect to $t_A$, so that the influencing of the printing density by the transition voltage during the time $t_L$ is insignificant.

Figure 3:
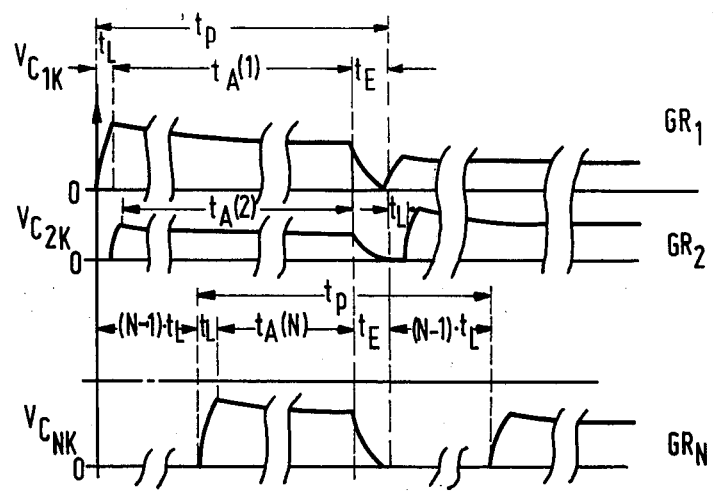
FIG. 3 shows a pulse diagram for the voltage across the corresponding printing capacitors $C_{1i}, C_{2i}, \ldots C_{Ni}$ with complete and simultaneous intermediate discharging of all capacitors.

FIG. 3 shows the pulse diagram for the corresponding printing capacitors $C_{1K}$, $C_{2K}$ ... $C_{NK}$ in the case of complete and simultaneous intermediate discharging of all printing capacitors at the end of a printing period of the first group.

The printing period $t_P$ consists of the charging time $t_L$, the printing time $t_A$ and the discharging time $t_E$. The charging of all capacitor groups takes place within the printing time $t_A^{(1)}$ of the first group.

The printing period $t_P$ is the same for all groups like in the first case, but the printing time $t_A^{(N)}$ of the $N^{th}$ group is (N−1) times the charging time $t_L$ smaller than the printing time $t_A^{(1)}$ of the first group. In order to make the difference in the operation of the individual groups negligibly small, the time $(N-1) \cdot t_L$ must be very small with respect to each preceding printing time $t_A^{(i)}$ (i<N). Obviously, the discharging of the printing capacitors can be separately performed for each group, so that the same printing time is available for each group. However, in that case more electronic components are required.

During the discharging time $t_E$, a printing action of the printing electrodes is also present, but this contribution is hardly important because the discharging time $t_E$ may be small with respect to the printing time $t_P$. Whether or not the charging time $t_L$ can also be used for the printing depends on the construction of the control elements SK and the switches S.

Figure 4:
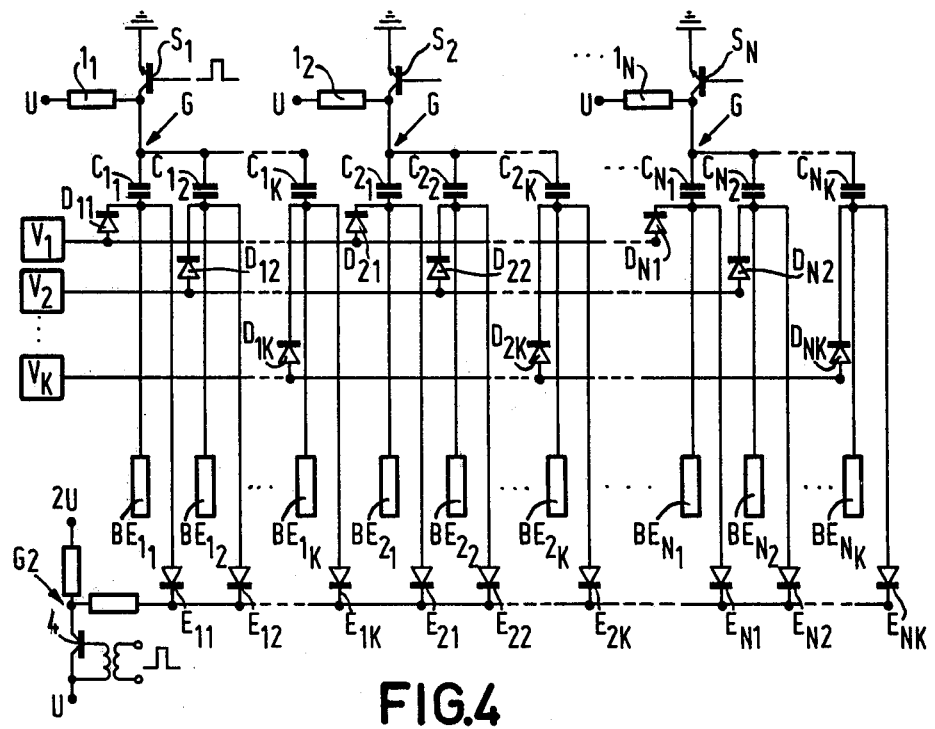
FIG. 4 shows a circuit arrangement for realizing a pulse diagram as shown in FIG. 3, comprising uncoupling and switching elements in the form of diodes and transistors.

FIG. 4 shows a circuit arrangement which operates according to the pulse diagram shown in FIG. 3 and which enable parallel printing in the case of the electrophoretic printing method as well as in the case of the corona printing method.

It is assumed that all printing capacitors C are in the discharged condition and that the group switches S are in the blocked position. The output voltages of the analog amplifiers V are in the range from 0 to −U Volts. For as long as the group switches S are blocked, the printing electrodes BE will carry the potential U, regardless of the voltages on the outputs of the amplifiers $V_1$-$V_K$ (obviously, this is applicable only to a period of time in the order of $R_D \cdot C$, where $R_D$ is the diode reverse resistance). A compensation voltage on the record carrier or on a reference electrode serves to ensure that printing cannot yet take place.

For the charging of the first capacitor group, the associated group switch S1 is switched during the charging time $t_L$, so that the common switching point G of the first group, previously carrying the potential U, now carries zero potential. The capacitors $C_{11}$ to $C_{1K}$ can thus be charged, via control diodes $D_{11}$ to $D_{1K}$, to the corresponding analog voltages of the associated amplifiers $V_1$ to $V_K$. At the end of the charging time $t_L$, the transistor S1 is blocked and the charging of the capacitors of this group is terminated. The voltage on the printing electrode reaches the higher value $U+V_{Ci}$, $V_{Ci}$ being the voltage present across the $i^{th}$ capacitor of the relevant group. Obviously, the voltage $V_{Ci}$ may differ from one capacitor to another. As a result of the compensation, only the capacitor voltage $V_{Ci}$ contributes to the printing.

The separate capacitor groups $C_1$ to $C_N$ are successively charged until all printing capacitors C are at the corresponding voltage $V_{Ci}$ at the end of the charging period after the time $N \cdot t_L$.

After termination of the charging period of all groups $GR_1$ to $GR_N$, the outputs of the amplifiers V are connected to the voltage U in order to minimize the discharging of the capacitors C via the reverse resistance of the diodes D. As a result, moreover, the dissipation of the amplifiers V is minimized. The capacitors C are partly discharged during the printing by the printing current and by leakage currents.

Before the capacitors C can be charged again for the printing of the next line, they have to be completely discharged. Discharging is simultaneously performed for all capacitors C via diodes E. During the printing, the common discharging transistor 4 is blocked, and the diodes E are connected in the reverse direction as shown in FIG. 4. For the discharging, the discharging transistor 4 is connected so that the diodes E are connected in the forward direction. The capacitors C are completely discharged.

Obviously, the printing electrodes can be supplied with negative voltages when all current directions and polarities are reversed.

The circuit shown in FIG. 4 can be advantageously used in a printing device based on the electrophoretic printing method. The printing electrodes BE are then formed by pins which are arranged at a short distance from the printing material or the printing cylinder used. In order to avoid electrical flash-overs between the printing electrodes, a maximum potential difference $U = +400$ V between adjacent electrodes is used. The printing period $t_P$ amounts to approximately 10 ms. The value of the printing capacitors is determined by the printing current, parasitic leakage currents, the capacitance of the printing electrodes with respect to ground and notably the capacitance of the printing electrodes with respect to each other. For electrophoretic printing, the charge loss of the printing capacitors due to the printing current is negligibly small. The lower limit of the capacitance of the printing capacitors is determined mainly by the parasitic capacitances. For capacitance values of between 50 pF and 100 pF per printing capacitor, the parasitic capacitances can already be neglected. For the charging time $t_L$, a period of time of between 5 and 20 μs can be obtained, and for the discharging time $t_E$ a period of a few hundreds of microseconds. For a resolution of four printing electrodes per millimeter and a configuration of twenty-one groups of fourty printing electrodes each, a charging period $T = N \cdot t_L$ of between 100 and 400 microseconds is obtained. Thus, the charging period T is small with respect to the printing period $t_P$ of 10 ms. Because the electrodes carry the potential $U + V_C$ (0 Volts $\leq V \leq +400$ V; $V_C$ is the voltage across a printing capacitor), a compensation voltage $U_K = U$ must be applied to the record carrier in order to ensure that only the voltages $V_C$ of the printing capacitors contribute to the printing.

The printing method with a corona ion source as disclosed in German Offenlegungsschrift No. 19 34 890 is a further possible application of the coincidence method and circuit arrangement in accordance with the invention as shown in FIG. 4.

Due to the extremely small charge quantities reaching the printing electrodes BE with this method, capacitances of between 50 pF and 100 pF suffice for the printing capacitors C. For example, if negative ions are present as charge carriers, the ion flow through a given aperture in the insulating foil is completely blocked at the instant at which the potential of the common electrode situated opposite the corona source exceeds the potential of the printing electrode BE associated with this aperture by the voltage $V_{Sperr}$. In the case of sufficiently thin foils and sufficiently small apertures, $V_{Sperr}$ is from approximately 50 to 100 V. Therefore, if the common electrode is connected to the voltage $U + V_{Sperr}$ and the printing electrodes BE of the circuit shown in FIG. 4 are connected to the voltage $U + V_C$ (0V $\leq V_C \leq$ U volts), the ion flow can be controlled image-wise by the voltages $V_C$.

Figure 5:
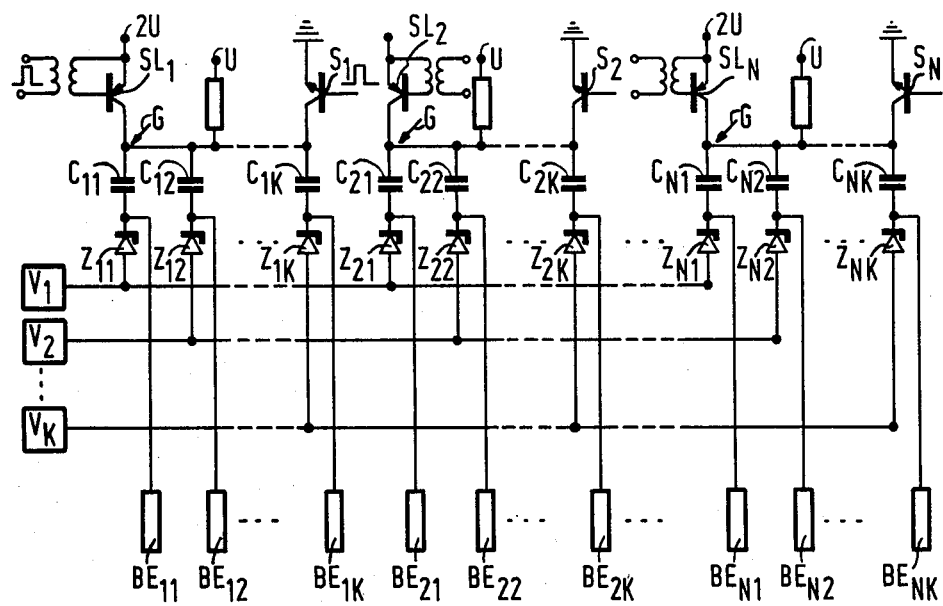
FIG. 5 shows a circuit arrangement for realizing a pulse diagram as shown in FIG. 3, comprising uncoupling and switching elements in the form of Zener diodes and transistors.

FIG. 5 shows a further circuit arrangement which is based on the pulse diagram of FIG. 3. The two uncoupling diodes D and E of the circuit arrangement shown in FIG. 4 are replaced by a single zener diode Z with the breakdown voltage 2U. During the charging time $t_L$, the zener diodes Z behave like the diodes D in FIG. 4 and enable the charging of the corresponding group of printing capacitors C when a switch S is switched over. The discharging switches SL are closed during the charging times $t_L$ and the printing times $t_A$, so that the voltages $U + V_C$ are present on the printing electrodes BE during the printing time as shown in FIG. 4. It will again be necessary to compensate for the voltage U by an equal voltage on the record carrier or on a reference electrode.

Only the discharging during the discharge time $t_E$ differs from that in the circuit arrangement shown in FIG. 4. For the simultaneous and complete discharging of all printing capacitors C, all discharging switches $SL_1$ to $SL_n$ are switched over and the outputs of the high voltage amplifiers V are connected to 0 Volts. As a result, a voltage drop of $2U + V_{Ci}$ occurs in the reverse direction across the zener diodes z, with the result that the zener diodes Z become conductive and the printing capacitors C are discharged.

Figure 6:
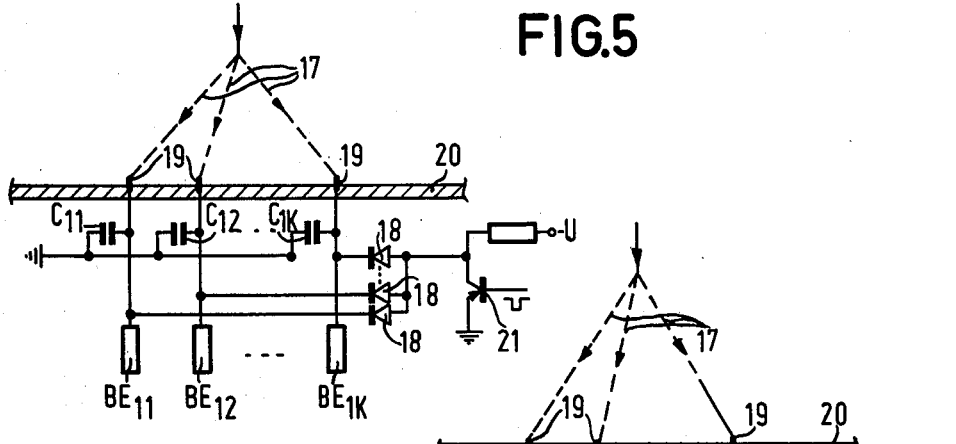
FIG. 6 shows a further embodiment which utilizes an image-wise modulated electron beam and purely electronic discharging of the printing capacitors.

FIG. 6 shows a further embodiment in which the charging of the printing capacitors C is realized by means of an image-wise modulated electron beam 17 which replaces the amplifiers V. The pulse diagram shown in FIG. 3 is again applicable. For the sake of simplicity, only the group $GR_1$ of printing electrodes BE with the associated printing capacitors C is shown. Contrary to all other circuit arrangements described which permit a positive as well as a negative printing electrode voltage, this method of charging the capacitors permits only a negative printing electrode voltage.

The printing capacitors C are connected to pins 19 which are embedded in the glass wall 20 of a cathode ray tube. An intensity modulated electron beam 17 scans the pins 19 and provides charging of the printing capacitors to the voltage corresponding to the image. Complete and simultaneous discharging of these capacitors is realized in that the discharging transistor 21 is switched. During the charging time and the printing time, the diodes 18 are required as uncoupling elements.

Figure 7:
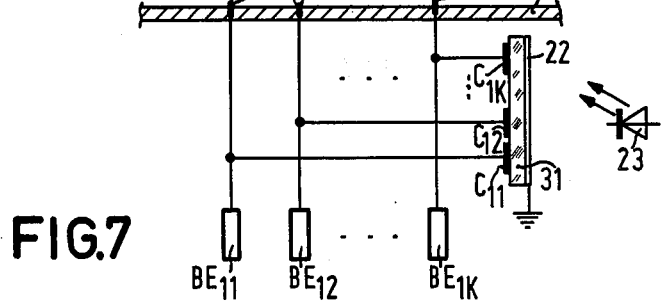
FIG. 7 shows a circuit arrangement as shown in FIG. 6, utilizing an image-wise modulated electron beam, however, with photoelectric discharging of the printing capacitors.

FIG. 7 shows a circuit arrangement which is similar in principle but which involves a different method of discharging of the printing capacitors. Like in the circuit arrangement shown in FIG. 6, the pins 19 embedded in the glass wall 20 of the cathode ray tube are scanned by an image intensity modulated electron beam 17 and the printing capacitors C which are integrated on a substrate 31 of a photoconductive material are charged to the corresponding voltage. The capacitors C comprise a common, grounded and transparent conductive layer 22. When the capacitors C are discharged, the photoconductive layer of the substrate 31 is irradiated through the transparent conductive layer 22 by a luminescent diode 23, so that the resistance of the photoconductive layer of the substrate 31 is reduced and hence the common discharging of the printing capacitors C is realized.

Figure 8:
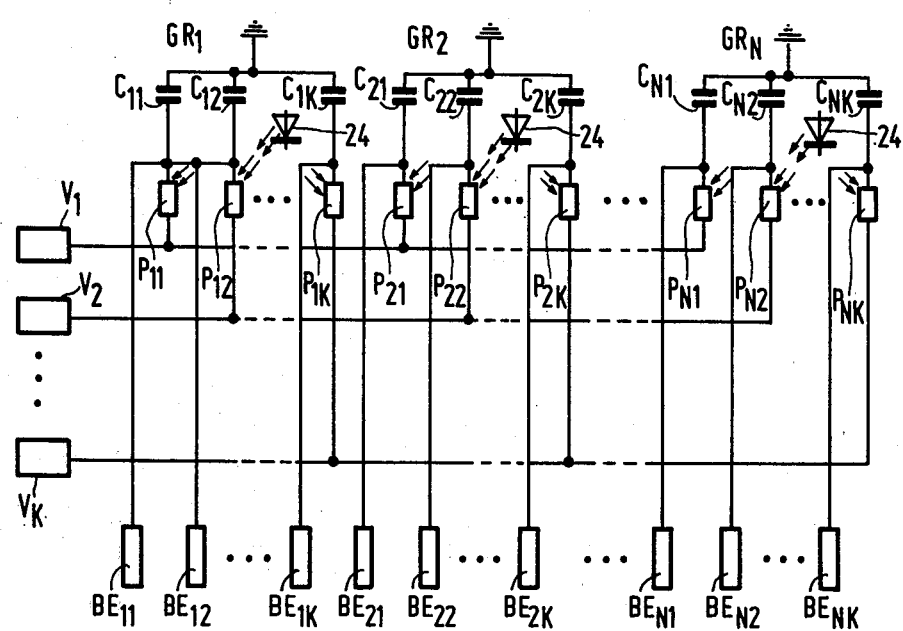
FIG. 8 shows a further embodiment, comprising uncoupling and switching elements in the form of photoconductive elements and luminescent diodes.

For the further embodiments shown in the FIGS. 8 to 11, the pulse diagram shown in FIG. 2 is applicable. The index i used for these circuit arrangements indicates the ordinal number of an arbitrary printing electrode group and the index j denotes the ordinal number within this group. FIG. 8 shows a circuit arrangement which comprises photoconductive elements P and light sources (for example, luminescent diodes) 24 as the uncoupling and control elements. The photoconductive elements P may consist of two photodiodes which are connected in series-opposition or of photoresistors. It is a characteristic aspect that a current can flow in both directions, so that no common discharging phase $t_E$ is required for the complete discharging of the printing capacitors C.

During the charging time $t_A$ of the given group of printing capacitors C, the luminescent diode 24 associated with this group irradiates the photoconductive elements P of this group with light, thus reducing the resistance, so that the printing capacitors C can be charged as well as discharged in accordance with the amplifier voltages present.

Figure 9:
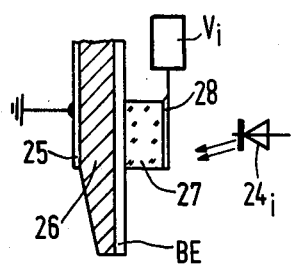
FIG. 9 is a cross-sectional view of an integrated arrangement as shown in FIG. 8, comprising photoresistors.

FIG. 9 is a sectional view of an integrated version of an arrangement as shown in FIG. 8 which utilizes a photoresistor. The printing capacitor C is formed by an electrode 25 which is common to all printing capacitors and which is connected to ground, and also by an insulator 26 and the printing electrode BE. For the charging and discharging of the printing capacitor, the photoresistor 27 is switched from dark resistance to light resistance by a transparent electrode 28, carrying the voltage $V_i$ corresponding to the image, by means of a luminescent diode 24.

Figure 10:
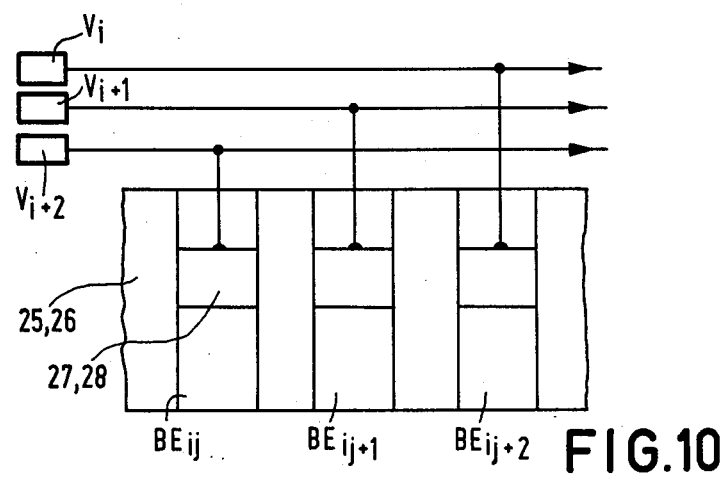
FIG. 10 is a front view of the device shown in FIG. 9.

FIG. 10 is a front view of this integrated device with several printing electrodes BE and photoresistors 27.

Figure 11:
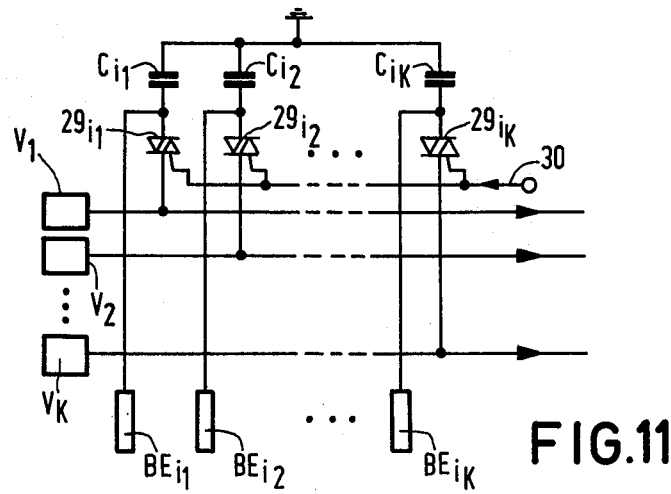
FIG. 11 shows a group of printing electrodes comprising switchable "resistors" in the form of triacs.

A group of printing electrodes BE and associated elements P as shown in FIG. 8 can also be replaced by a circuit arrangement as shown in FIG. 11. For the switchable "resistors," allowing a current in both directions, use is made of triacs 29. The triacs 29 are switched independently of the polarity of the voltage applied to the triacs via a common line 13 by a voltage pulse on the gate electrodes.

The charging time $t_L$ for the printing capacitors of a group is determined by the maximum permissible capacitor current and by the value of the triac holding current. The next group of triacs may be switched only after the current through each individual triac 29 of the preceding group has decreased to below the value of the hold current, so that the relevant triacs have been blocked again.

We claim:

1. A circuit arrangement for controlling a large number of printing electrodes for the non-mechanical parallel printing of character elements or image elements, the printing electrodes being combined to form groups, each of which has a common switching point, corresponding printing electrodes of each group being associated with a common voltage amplifier via electronic control elements, a selected printing electrode being controlled by the switching of a group switch and an amplifier, characterized in that a capacitor (C) is connected between the common switching point (G) of a group of printing electrodes and the electrical control element (SK) associated with each printing electrode (BE), the capacitor (C) associated with an arbitrary printing electrode (BE) being charged to the analog voltage generated in the associated amplifier (V) by the closing of the group switch (S) of the relevant group, said voltage determining the printing effect of the associated printing electrode (BE), the discharging of the capacitor (C) which takes place after the opening of the group switch (S) during the printing time for an image element by the associated printing electrode (BE) being substantially slower than the preceding charging, the capacitors (C) being group-wise successively charged to the voltages which are analogous to the information to be printed, the time required for the charging of all capacitors (C) being less than the printing time for one image element.

2. A circuit arrangement as claimed in claim 1, characterized in that the control element (SK) is a diode (D), the common switching point (G) of a printing electrode group being connected to a switching transistor (S) which acts as a group switch and to a voltage source (U) whose voltage is equal to or higher than the highest analog voltage to be supplied by the amplifiers (V), the switching transistor (S) being conductive for the charging of a capacitor (C) of the group, so that the common switching point (G) is at a zero potential.

3. A circuit arrangement as claimed in claim 2, characterized in that for the discharging of the capacitors (C), each printing electrode (BE) is connected, via a further diode (E), to a further common switching point (G2) which, after the printing, is made to assume a voltage value which corresponds to the voltage value on the common switching point (G) of each group.

4. A circuit arrangement as claimed in claim 1, characterized in that the electronic control element (SK) is a zener diode (Z), the common switching point (G) of a printing electrode group being connecting to a switching transistor (S) which serves as a group switch and to a voltage source (U), the voltage of the voltage source (U) being lower than that of a further voltage source (2U) which can be connected to the common switching point (G) by a further switching transistor (SL), the capacitor (C) being charged via the zener diode (Z) when the former transistor (S) is conductive.

5. A circuit arrangement as claimed in claim 4, characterized in that the switching transistors (SL) of all groups are made conductive and the voltage amplifiers (V) are at zero potential for the discharging of the capacitors (C).

6. A circuit arrangement as claimed in claim 1, characterized in that the printing electrodes (BE) of each group are connected to associated pins (19) in the glass wall (20) of a cathode ray tube, the capacitors (C) being charged by an electron beam (17) which scans the pins (19), the electron beam (17) being modulated with the analog voltage associated with each pin (19) for the printing.

7. A circuit arrangement as claimed in claim 6, characterized in that the capacitors (C) of a group are accommodated on a substrate (31) of a photoconductive material which is irradiated by a light source (23) as required.

8. A circuit arrangement as claimed in claim 7, characterized in that the capacitors (C) are integrated in the substrate (31) and comprise a common, grounded and transparent conductive layer (22).

9. A circuit arrangement as claimed in any of the claims 6 to 8, characterized in that the light source (23) which is common to all groups acts for the discharging of the capacitors (C).

10. A circuit arrangement as claimed in claim 1, characterized in that the electronic control elements (SK) are formed as photoconductive elements (P), the common switching point of a printing electrode group being connected to zero potential, the photoconductive elements (P) beinhg group-wise consecutively irradiated by one or more light sources which act as group switches in order to charge or recharge the capacitors (C).

11. A circuit arrangement as claimed in claim 10, characterized in that the capacitors (C), the printing electrodes (BE) and the photoconductive elements (P) are integrated in the printing head (FIG. 9).

* * * * *